US005245188A

United States Patent [19]

Satake et al.

[11] Patent Number: 5,245,188

[45] Date of Patent: Sep. 14, 1993

[54] APPARATUS FOR EVALUATING THE GRADE OF RICE GRAINS

[75] Inventors: Toshihiko Satake, Higashihiroshima; Satoru Satake, Oota; Yasuharu Mitoma, Higashihiroshima, all of Japan

[73] Assignee: Satake Engineering Co., Ltd., Japan

[21] Appl. No.: 879,425

[22] Filed: May 7, 1992

Related U.S. Application Data

[62] Division of Ser. No. 392,277, Aug. 10, 1989, Pat. No. 5,135,114.

[30] Foreign Application Priority Data

Aug. 11, 1988 [JP] Japan ................................ 63-201314
Nov. 28, 1988 [JP] Japan ................................ 63-301537

[51] Int. Cl.[5] ............................................. G01N 21/35
[52] U.S. Cl. ..................................... 250/341; 250/339
[58] Field of Search ...................... 250/341, 339, 359.1, 250/340; 356/446

[56] References Cited

U.S. PATENT DOCUMENTS 4,752,689 7/1988 Satake ................................ 250/341

FOREIGN PATENT DOCUMENTS 56-125664 10/1981 Japan .
57-153249 9/1982 Japan .
62-150141 7/1987 Japan .

*Primary Examiner*—Paul M. Dzierzynski
*Assistant Examiner*—Richard Hanig
*Attorney, Agent, or Firm*—Wegner, Cantor, Mueller & Player

[57] ABSTRACT

An apparatus for evaluating the grade of rice grains includes a grain supply unit, vibrating troughs on which the rice grains run in their longitudinal posture, flow-down troughs having slits each opening to each of the flow-down troughs, a reflected light measuring unit having its light sources and its detecting element for detecting the amount of the light reflected from said rice grains, a transmitted light measuring unit having its light sources and its detecting element for detecting the amount of the light transmitted through the rice grains at the positions of said slits, and a calculation control unit for digitally calculating the values measured at the reflected light measuring unit and the transmitted light measuring unit for evaluating the rice grains into a plurality of grades. The light sources for reflection may be of visible light and the light source for transmission may be of infrared light. Also, it is possible to use a single unit, namely, a reflected and transmitted light measuring unit, having a reflected light detecting element and a transmitted light detecting element for measuring both the reflected light amount and the transmitted light amount from the rice grains at the same positions of the slits.

3 Claims, 8 Drawing Sheets

ANALYTIC WAVEFORMS OF REFLECTED LIGHT

ANALYTIC WAVEFORMS OF TRANSMITTED LIGHT

APPARATUS FOR EVALUATING THE GRADE OF RICE GRAINS

This application is a divisional of Ser. No. 7/392,277, filed Aug. 10, 1989 now U.S. Pat. No. 5,135,114.

BACKGROUND OF THE INVENTION

The present invention relates to an apparatus for evaluating the grade of rice grains such as brown rice, white rice and unhulled rice grains.

In a country such as Japan, such grains as rice grains are subject of severe and strict examination for grading or classification under the law and regulations concerned. The examiners for evaluating the grade of grains are those who have been highly trained to be able to make correct decisions for grades. However, it cannot be guaranteed that such examiners do make correct decisions at all times because the methods of examination normally available are for them to grade grains by the eye only.

The disclosure relating to an apparatus for evaluating the quality or grade of brown rice grains is found, for example, in Japanese Patent Application Kokai No. 125664/1981 and methods of evaluating the same, for example, in Japanese Patent Application Kokai No. 153249/1982 and Japanese Patent Application Kokai No. 150141/1987.

The apparatus disclosed in Patent Application Kokai No. 125664/1981 is one in which each of the grains is irradiated one at a time by a visible ray and the amount of reflected light and the amount of transmitted light are measured thereby to make the determination as to whether the given grain is a complete grain, a milk white grain, a greenish grain, a brownish grain or a dead grain. Patent Application Kokai No. 153249/1982 discloses a method in which each of the grains is irradiated by a ray of a predetermined wave length and the factor of transmission is measured thereby to make the determination as to whether the given grain is an inferior one by the comparison of the transmission factor with the predetermined value of threshold. Patent Application Kokai No. 150141/1987 discloses a method in which each of the brown rice grains is irradiated by a ray and the amount of diffused transmitted light, the amount of diffused reflected light, the amount of light having predetermined two wave lengths in the diffused reflected light and the amount of transmitted light at two positions of each of the grains are detected thereby to make the determination as to whether the given grain is a complete grain, a milk white grain, an immature greenish grain, a cracked grain, a damaged grain, a discolored grain, and a greenish or whitish dead grain. The determination is enabled by the calculation of the ratios of the amount of diffused transmitted light and the amount of diffused reflected light and the ratios of the amounts of light of the optional two wave lengths among the diffused reflected light and the amounts of transmitted light at two positions of each of the grains and by the processing of the ratio value of the respective amounts of light for making the determination.

With the conventional apparatus or methods as described above, it was not possible to achieve an accurate grading determination of grains because the matters subject for detection as reference for the determination are of a single datum covering only the amount of reflected light and the amount of transmitted light. That is, even when the given grain is a complete grain (regular grain), the amount of reflected light and the amount of transmitted light can vary due to different factors such as rice plant varieties, production districts and cultivating methods and such grain may not necessarily be evaluated as a complete grain and this makes it difficult to achieve the constant and high accuracy for the grading determination. As an example, a frequency distribution of foreign particles and various grades of grains such as discolored grains, chalky grains is shown in FIG. 11 from which it is understood that, since the curves for respective grains overlap one another in the direction of X axis (brightness=amount of reflected light), it is not possible to achieve an accurate determination of the respective grades when the border lines among them are positioned at such overlapped regions.

It is more desirable that the measuring of the transmitted light and the reflected light takes place at the same position in a means on which rice gains flow. If the measuring is made at different positions respectively for the transmitted light and for the reflected light, it is possible for the grain to develop changes between the two positions and such changes adversely affect the evaluation of the grade of rice grains.

In order to overcome the problems as explained above, the present invention provides an apparatus for evaluating the grade of rice grains with which it is possible to perform an accurate determination of grades of rice grains.

SUMMARY OF THE INVENTION

According to the present invention, there is provided an apparatus for evaluating the grade of rice grains comprising:

a grain supply unit for supplying rice grains;

a vibrating trough means extending horizontally and having a plurality of grain flow grooves on which the rice grains supplied from said grain supply unit run in their longitudinal posture from the supply side to the discharge side;

an inclined trough means provided at the discharge side of said vibrating trough means and having a plurality of flow-down troughs and a plurality of slits each opening to each of said flow-down troughs;

a reflected light measuring unit having light sources for irradiating the rice grains flowing down on said flow-down troughs and a reflected light detecting element for detecting the amount of the light reflected from said rice grains;

a transmitted light measuring unit having light sources provided behind said inclined trough means at positions corresponding to those of said slits and transmitted light detecting elements for detecting the amount of the light transmitted through said rice grains at the positions of said slits; and a calculation control unit for calculating the values measured at said reflected light measuring unit and said transmitted light measuring unit for evaluating the rice grains into a plurality of grades.

According to the present invention, there is also provided an apparatus for evaluating the grade of rice grains comprising:

a grain supply unit for supplying rice grains;

a vibrating trough means extending horizontally and having a plurality of grain flow grooves on which the rice grains supplied from said grain supply unit run in their longitudinal posture from the supply side to the discharge side;

an inclined trough means provided at the discharge side of said vibrating trough means and having a plurality of flow-down troughs and a plurality of slits each opening to each of said flow-down troughs;

light sources of visible light for irradiating from above on the rice grains flowing down through said inclined trough means;

light sources of infrared light provided behind said inclined trough means at positions corresponding to those of said slits;

a reflected and transmitted light measuring unit having a reflected light detecting element and a transmitted light detecting element for measuring the reflected light amount and the transmitted light amount from the rice grains flowing down at the positions of said slits; and a calculation control unit for calculating the values measured at said reflected and transmitted light measuring unit for evaluating the rice grains into a plurality of grades.

It is due to the arrangement wherein a step or steps are provided in the grain flow grooves of the vibrating trough means that, without employing any complex structure, sample grains can be fed into the reflected and transmitted light sensing area in such a manner that the sample grains successively flow in lines with appropriate spaces being provided therebetween.

The values measured at the reflected light measuring unit and those at the transmitted light measuring unit change with the passage of time and this means that the waveforms measured at the measuring units change as grains pass through the measuring area. By digitally treating the waveforms at the calculating control means, it is possible to use fine changes in the waveforms as characteristic representations of various information. Such is not possible in an analogue arrangement in which one waveform can be used only for one piece of information.

Thus, the various information resulted from the digital treatment as explained above is two fold, that is, that of the reflected light and that of the transmitted light. With this combined two folded information, it is possible to determine inferior grains such as scratched grains, chalky grains, immature grains, damaged grains, dead grains, discolored grains, foreign particles which form the bases of the determination for grades or classes of grains and it is also possible to obtain the ratio of each of such bad grains in the given grains.

Also, the employment of the two different light sources having different ranges of wavelengths and the employment of an appropriate mirror and filters which correspond to the respective ranges of wavelengths have made it possible to take in at the same fixed position the signals of both the reflected light amount and the transmitted light amount.

Further, by the employment of the half-mirror plus the cut-filter or the dichromic mirror, it is made possible to arrange the light sensing unit as one unitary structure having one condensing lens for the two light sources having different ranges of wavelengths.

DESCRIPTION OF THE PREFERRED EMBODIMENTS

Figure 1:
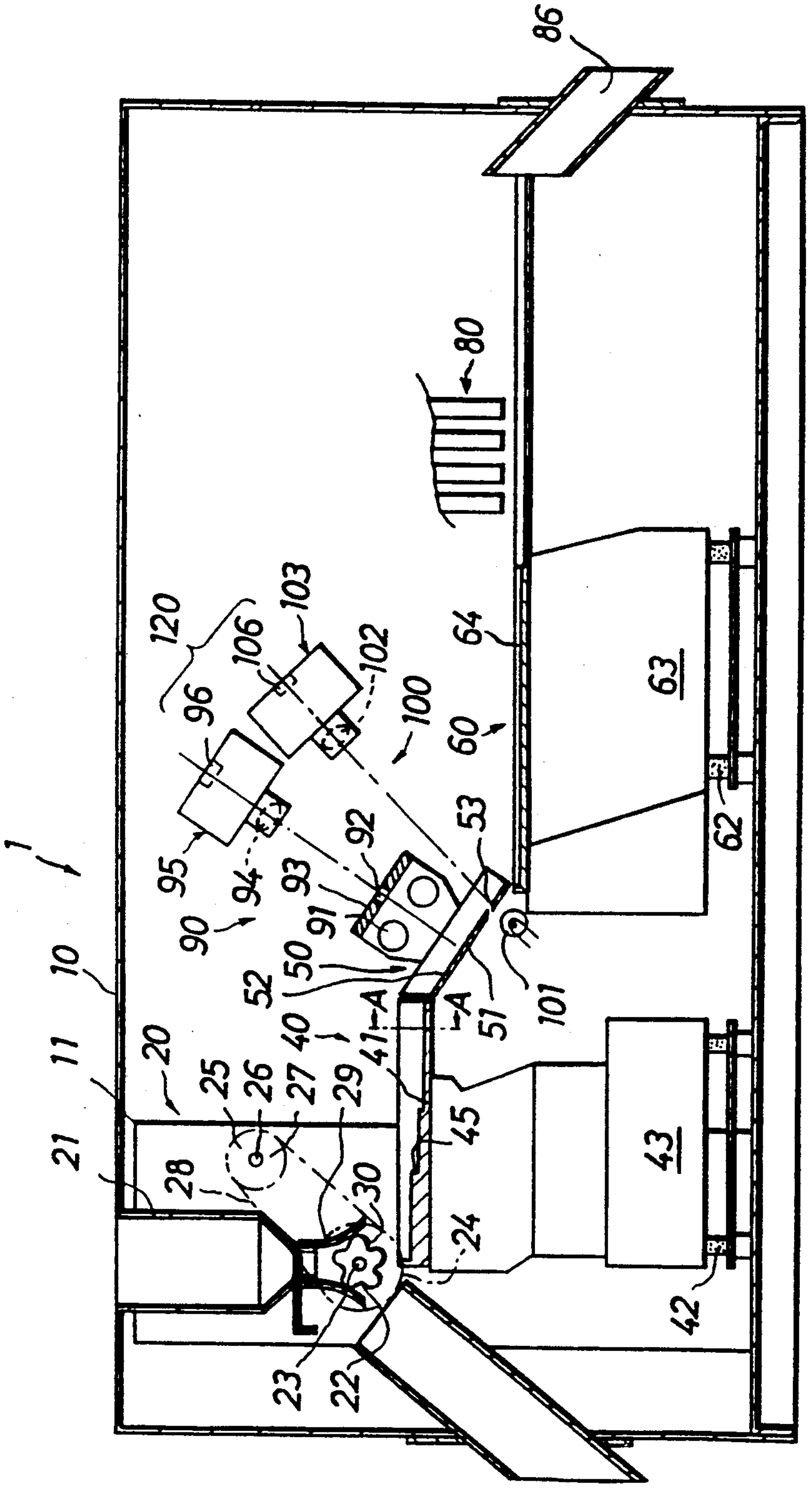
FIG. 1 shows a first embodiment of the apparatus for evaluating the grade of rice grains according to the present invention.

Hereinafter, some preferred embodiments of apparatus for evaluating the grade of rice grains according to the present invention will be explained by reference being made to the accompanying drawings. First, an apparatus for evaluating the grade of rice grains as a preferred first embodiment is explained by reference being made to the FIG. 1 to FIG. 3 and FIG. 7.

The reference numeral 1 represents the apparatus for evaluating the grade of rice grains according to the present invention. A machine frame 10 is provided with a supply hopper 21 which carries at the bottom part thereof a valve 22 which releases an appropriate amount of samples from the supply hopper 21. A pulley 24 mounted on a rotary axle 23 of the valve 22 rotates, together with a pulley 27 which is mounted on a rotary axle 26 of a driving motor 25 supported by a supporting frame 11, by means of a timing belt 28 carried by the pulley 27. The valve 22, which is rotated by the driving motor 25, together with the supply hopper 21 forms a valve unit 20. The valve unit 21 is provided with a scattering prevention cover 29 which extends from the bottom portion of the supply hopper 21 and surrounds the periphery of the valve 22. The valve 22 has grooves 30 which are formed on the circumference thereof with predetermined intervals in the direction of rotation so as to allow the samples to be intermittently released from the supply hopper 21.

The sample grains which are discharged from the valve unit 20 drop onto a vibrating trough means 40 (hereinafter referred to as "forwarding feeder 40"), carried within the machine frame 10, having a plurality of grain flow grooves 41 thereon. The sample grains which have been forwarded by the forwarding feeder 40 flow down in a line through an inclined trough means 50 cooperating at and extending from the outlet side of the forwarding feeder 40. On the upper surface of the inclined trough means 50, there are provided the same number of flow-down troughs 51 as the number of the grain flow grooves 41 provided on the forwarding feeder 40. The width of each grain flow groove 41 and each flow-down trough 51 is only slightly wider than the width of the grain so as to allow the grain to flow in its longitudinal posture in the grain flow groove 41 and the flow-down trough 51. The sample grains which have passed through the inclined trough means 50 then drop onto a second vibrating trough means 60 (hereinafter referred to as "sorting feeder 60"), which is disposed at and associated with the discharging side of the inclined trough means 50. At an appropriate position over the sorting feeder 60, there is provided a sorting means 80 for sorting out or ejecting such lower grade grains as damaged grains, scratched grains, cracked grains, discolored grains and dead grains.

The sample grains having been moved forward by the sorting feeder 60 and not having been sorted out as those to be removed by the sorting means 80 are discharged out from an outlet 86 at the outlet end of the sorting feeder 60. The grains which have been sorted out by the sorting means 80 as those of inferior grade move through transferring pipes 83 and are discharged out from an outlet (not shown) which is different from the outlet 86 at the outlet end of the sorting feeder 60.

Figure 2:
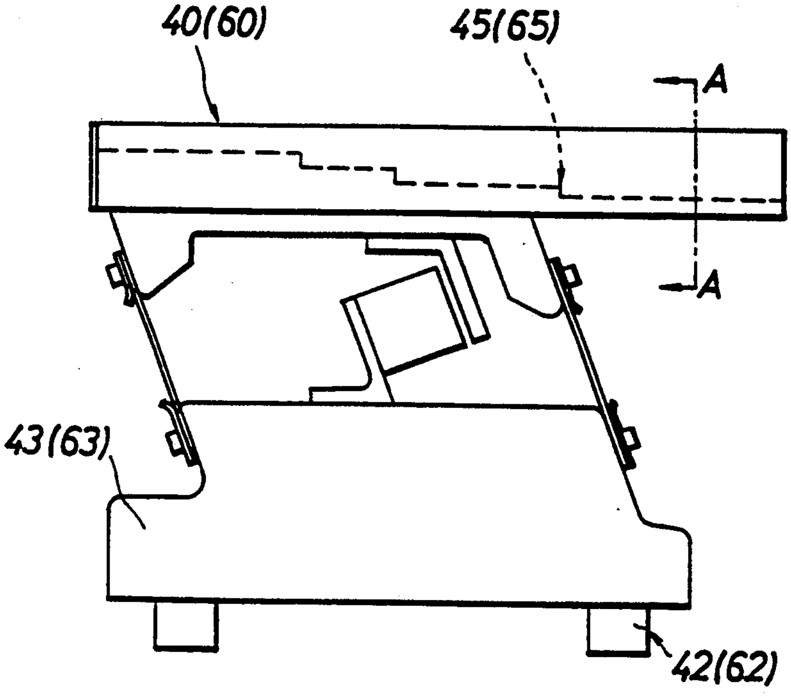
FIG. 2 shows sectional view of the forwarding feeder and the sorting feeder.
Figure 7:
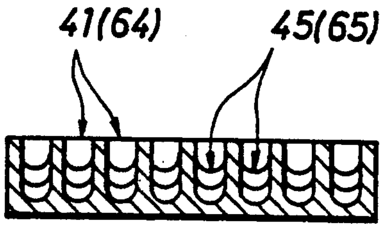
FIG. 7 is a sectional view of the forwarding feeder and the sorting feeder seen from the lines A—A in FIG. 2.

The forwarding feeder 40 and the sorting feeder 60 are carried respectively by the base members 43, 63 which are supported by the machine frame 10 with rubber members 42 being provided between the forwarding feeder 40 and the machine frame 10 and rubber members 63 between the sorting feeder 60 and the machine frame 10. Also, as seen in FIG. 2, there are provided a step or steps 45, 65 downwardly in the direction of the flow of the grains. FIG. 7 is a sectional view of the forwarding feeder 40 and the sorting feeder 60, seen from the lines A—A in FIG. 2.

A reflected light measuring unit 90 is provided above the inclined trough surface 52 of the trough means 50 and a transmitted light measuring unit 100 is provided off to the lower right of the reflected light measuring unit 90. The reflected light measuring unit 90 is constituted by light sources 91 irradiating the sample grains flowing down on the inclined trough surface 52, a cover 93 covering the light sources 91 and having a slit 92 therein, and a reflected light measuring lens case 95 housing therein a condensing lens 94 and located at a predetermined position along a line which is vertical to the inclined trough surface 52.

On the other hand, the transmitted light measuring unit 100 is constituted by a light source 101 which irradiates the sample grains from the back side of the inclined trough surface 52 through the slit 53 provided in the lower portion of the inclined trough means 50, and a transmitted light measuring lens case 103 which houses therein a condensing lens 102 and is located at a predetermined position along a line vertical to the inclined trough surface 52 and which detects from the light source 101 the light having passed through the slit 53 or transmitted through the sample grain. The transmitted light measuring lens case 103 houses therein a transmitted light detecting element 106. The slit 53 is provided slantingly with respect to the inclined trough surface 52.

The reflected light measuring unit 90, the transmitted light measuring unit 100 and the inclined trough means 50 thus form a light amount sensing means 120. The number of the condensing lens 94 can either be the same number as that of the flow-down troughs 51 of the inclined trough 50 or be one for a plurality of light amount detecting elements 96, 106 the number of which is the same as that of the flow-down troughs 51.

Figure 3:
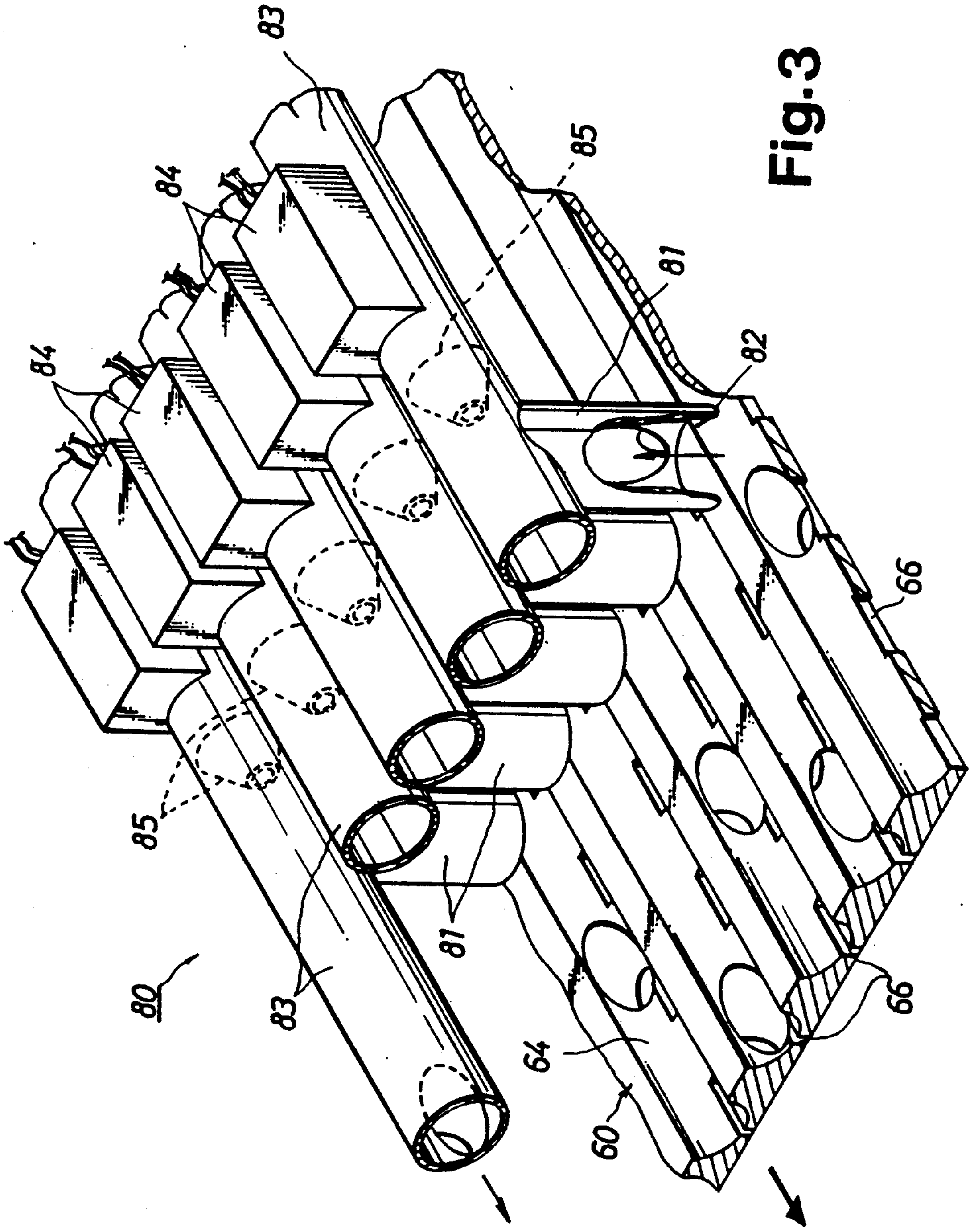
FIG. 3 is a perspective view, partly in broken, of the sorting means.

Next, the explanation is made of the sorting means 80 with reference being made mainly to FIG. 3. The sorting means 80 is so arranged that, on the sorting feeder 60 having a plurality of grooves 64, there is provided for each of the grooves 64 a suction duct 81 whose mouth 82 opens to each of the grooves 64. The suction duct 81 stands perpendicular to the sorting feeder 60 and its upper end is connected and opens to the transferring pipe 83 which is substantially horizontally extending. The inner diameters of both the suction dust 81 and the transferring pipe 83 are such as to allow rice grains to pass therethrough. One end of each of the transferring pipes 83 is connected to an air compressor not shown in the drawings and the other end thereof opens to a rice grain receiving box disposed at an appropriate space within or outside the machine frame 10. In each of the transferring pipes 83, at a position which is between the suction duct 81 and the air compressor but which is closer to the suction duct 81, there is provided a electromagnetic valve 84 which is operated by the operation signals from a calculation control means 113. In each of the transferring pipe 83, there is provided an ejector in the form of a nozzle 85 which is disposed at a location adjacent to the suction duct 81 and to which reaches the compressed air sent by the operation of the electromagnetic valve 84. With this arrangement, the calculation control means 113 analyses the values measured by the light amount sensing means 120 and, when the analysis indicates that the given grain is an inferior one, the electromagnetic valve 84 is operated by the signal from the calculation control means 113 and the compressed air passes through the nozzle 85. At this moment, the pressure within the suction duct 81 becomes low thereby allowing an inferior grain to be sucked in through the mouth 82 and to be removed out to the grain receiving box through the transferring pipe 83. It is desirable that a number of air holes or slits are provided in the bottom of each of the grooves of the sorting feeder 60 so that the air can be sucked from under the grooves and that no grains other than the foreign particles or inferior grains are sucked and removed.

Figure 4:
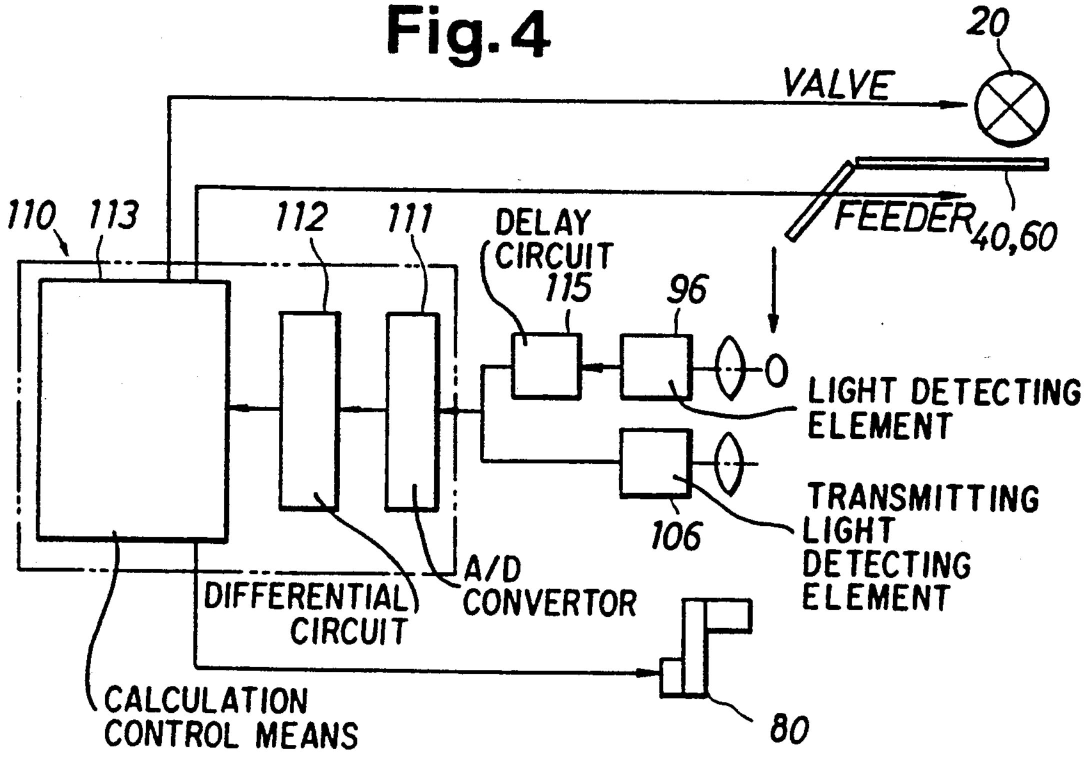
FIG. 4 is a block diagram of the calculation control unit.
Figure 6A:
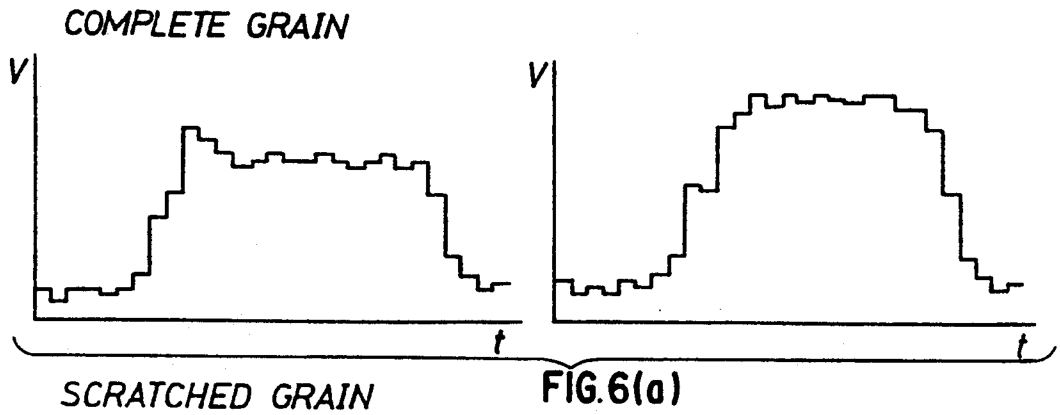
FIGS. 6(*a*)–6(*d*) show several combinations of waveform patterns of the transmitted light and the reflected light.
Figure 6B:
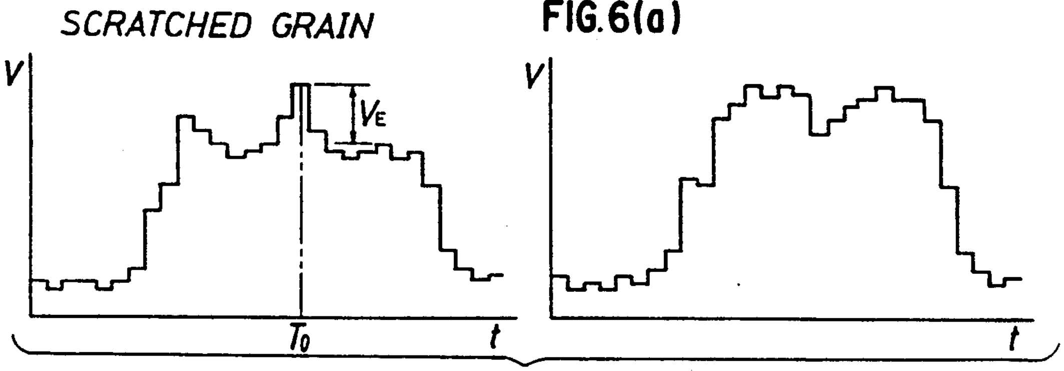
Figure 6C:
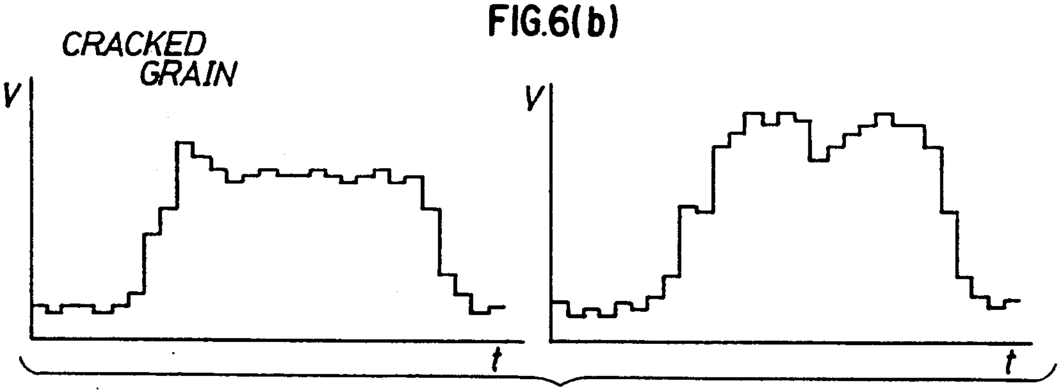
Figure 6D:
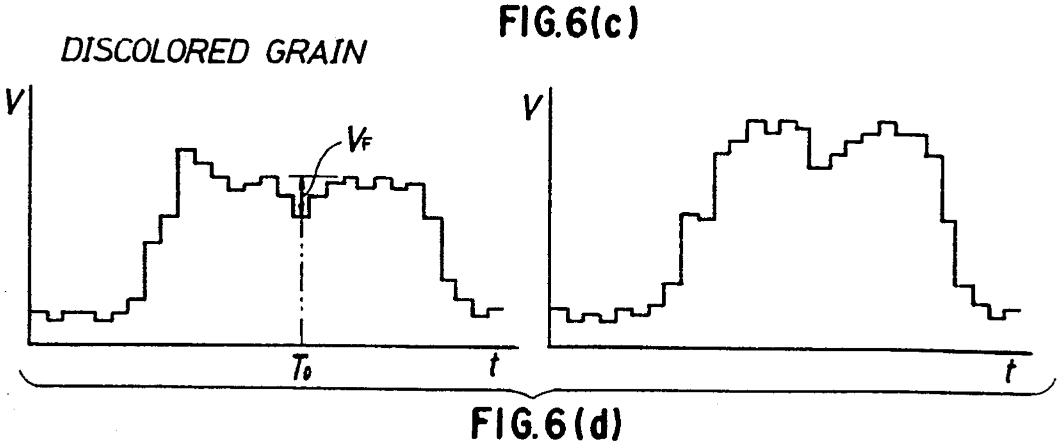

Now, the arrangement of the calculation control means is explained with reference being made to FIG. 4. The reflected light detecting element 96 and the transmitted light detecting element 106 are respectively connected to the calculation control means 113 through an A/D convertor 111 and a differential circuit 112. The calculation control means 113, the A/D convertor 111 and the differential circuit 112 form a calculation control unit 110. Connected to the calculation control means 113 are the electromagnetic valve 84 of the sorting means 80, the driving motor 25 of the valve means 22, the respective driving means for the forwarding feeder 40 and the sorting feeder 60.

Now, how the apparatus as arranged above functions will be explained.

Sample grains are put in the supply hopper 21. The calculation control means 113 then starts the operation of the valve 22, the forwarding feeder 40 and the sorting feeder 60.

The sample grains which are fed into the feeding portion of the forwarding feeder 40 by the operation of the valve 22 are supplied to the light amount sensing means 120 in the state in which the rice grains successively flow with appropriate spaces therebetween caused by the vibration of the forwarding feeder 40 and the dropping of the grains at the step or steps 45 and in which the rice grains are guided in lines by the grain flow grooves 41. The grains move into the inclined trough 50 of the light amount sensing means 120. Accordingly, the grains successively and in their longitudinal posture pass through the slit 92 of the reflected light measuring unit 90 and the slit 53 of the transmitted light measuring unit 100. The time it takes for one grain to pass through each of the slits 92, 53 is 10 ms. In the predetermined sequence, the reflected light measuring unit 90 and the transmitted light measuring unit 100 measure at the slits 92, 53 of each of the grooves the amount of the reflected light and the amount of the transmitted light. Although this depends on the number of grooves provided in the inclined trough 50, the forwarding feeder 40 and the sorting feeder 60, the time required for completing all the measuring at the slit of each and all of the grooves is assumed to be 0.5 ms. That is, in 10 ms during which one grain passes through the slit 92 or the slit 53, each of the reflected light measuring unit 90 and the transmitted light measuring unit 100 can receive 20 measured signals. That these 20 signals forms the measured signals with respect to one grain is one of the features which distinguishes the apparatus of the present invention over conventional apparatuses.

Figure 5:
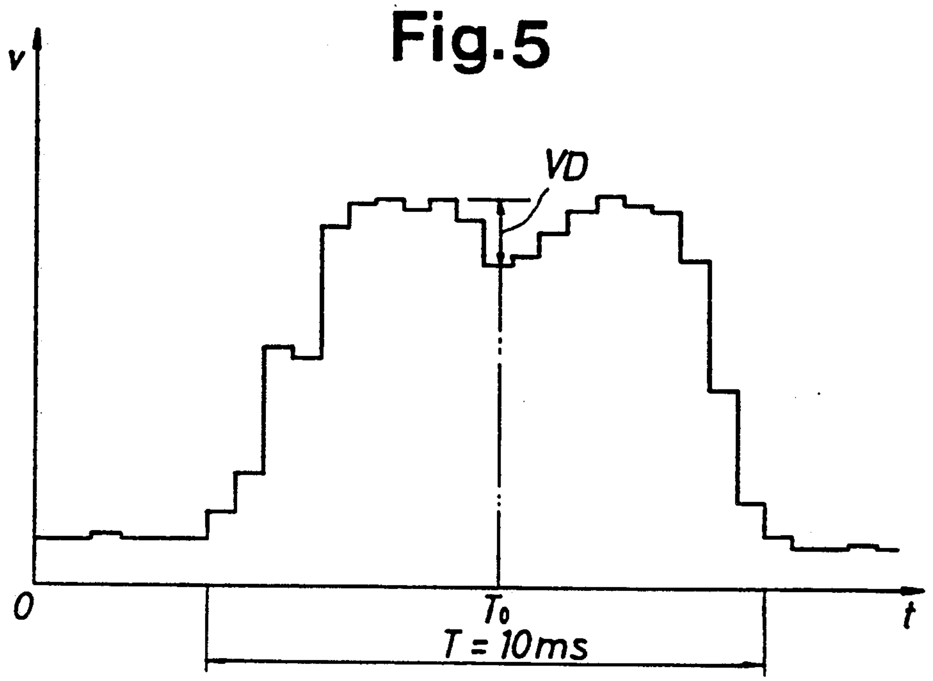
FIG. 5 is an analytic waveform of transmitted light.

From among the measured signals which the respective light measuring units obtained twenty times respectively through the respective slits, the measured signals obtained by the measuring of one grain for twenty times are digitally treated and shown as time T in the transverse axis and signal levels V of the measured signals in the vertical axis in FIG. 5. The time T is determined by the longitudinal length of the grain and the movement speed of the grain, in this example, T is 10 ms as mentioned above.

In the drawings, the level change $V_d$ at the time of $T_o$ shows that the amount of transmitted light is decreased only at this portion. However, it is not possible to determine from this information alone whether the cause is due to the injury, the crack or the discoloration. Now, FIG. 6(*b*) illustrates the signals of the measured reflected light amount obtained all simultaneously and with respect to the same grain as above. In FIG. 6(*b*), the level change $V_E$ at the time of $T_o$ shows that the amount of reflected light is increased only at this portion, from which it is understood that the surface of the grain at this portion was whiter than that of other portions. When this is combined with the transmitted light amount shown in FIG. 5, it is possible to determine that the given grain was a scratched grain. If the signals measured by the reflected light measuring unit are as shown in FIG. 6(*d*), it is understood that at the time of $T_o$ the light amount of reflected light is decreased by the level $V_F$. When this is combined with the transmitted light amount as shown in FIG. 5, it is possible to determine that the given grain was a discolored grain.

The arrangement as explained above enables to obtain an easy and accurate evaluation of the grade of rice grains and this is achieved by the arrangement wherein, during the time in which one grain passes through the slits, the signals obtained from both the reflected light measuring unit and the transmitted light measuring unit are respectively subjected to digital treatment and wave-analysis and, thus, the evaluation is performed based on the combination of the two types of light amount detected signals.

FIGS. 6(*a*)–6(*d*) show representative examples of the signal forms of the light amount of reflected light and the transmitted light which are obtained at the time when a complete grain, a scratched grain, a cracked grain and a discolored grain passes respectively at the slits. As there occurs a measurement timing lag, which corresponds to the physical lengths between the slits, between the reflected light measuring operation and the transmitted light measuring operation, this timing lag is compensated by a delay circuit 115 as shown in FIG. 4.

The signals obtained by the arrangement as explained above are treated at the calculation control means 113 for performing the evaluation of the grade of rice grains. When, following such evaluation, the grain which has been judged as an inferior grain passes under the sorting means 80, the signal from the calculation control means 113 accurately actuates the electromagnetic valve 84 because the sequence of the passage and the average time of the passage of the grain are memorized. By the operation of the electromagnetic valve 84, the inferior grain is sucked at the mouth 82 into the transferring pipe 83 and discharged out to the grain receiving box.

According to the present invention, the apparatus is capable of providing many different evaluation references or standards and this is enabled because the arrangement is such that many different data for the evaluation can be taken from one fixed position of the inclined trough. The apparatus of the present invention is distinguished from conventional apparatuses in which only one signal was taken from one grain for the evaluation.

Figure 8:
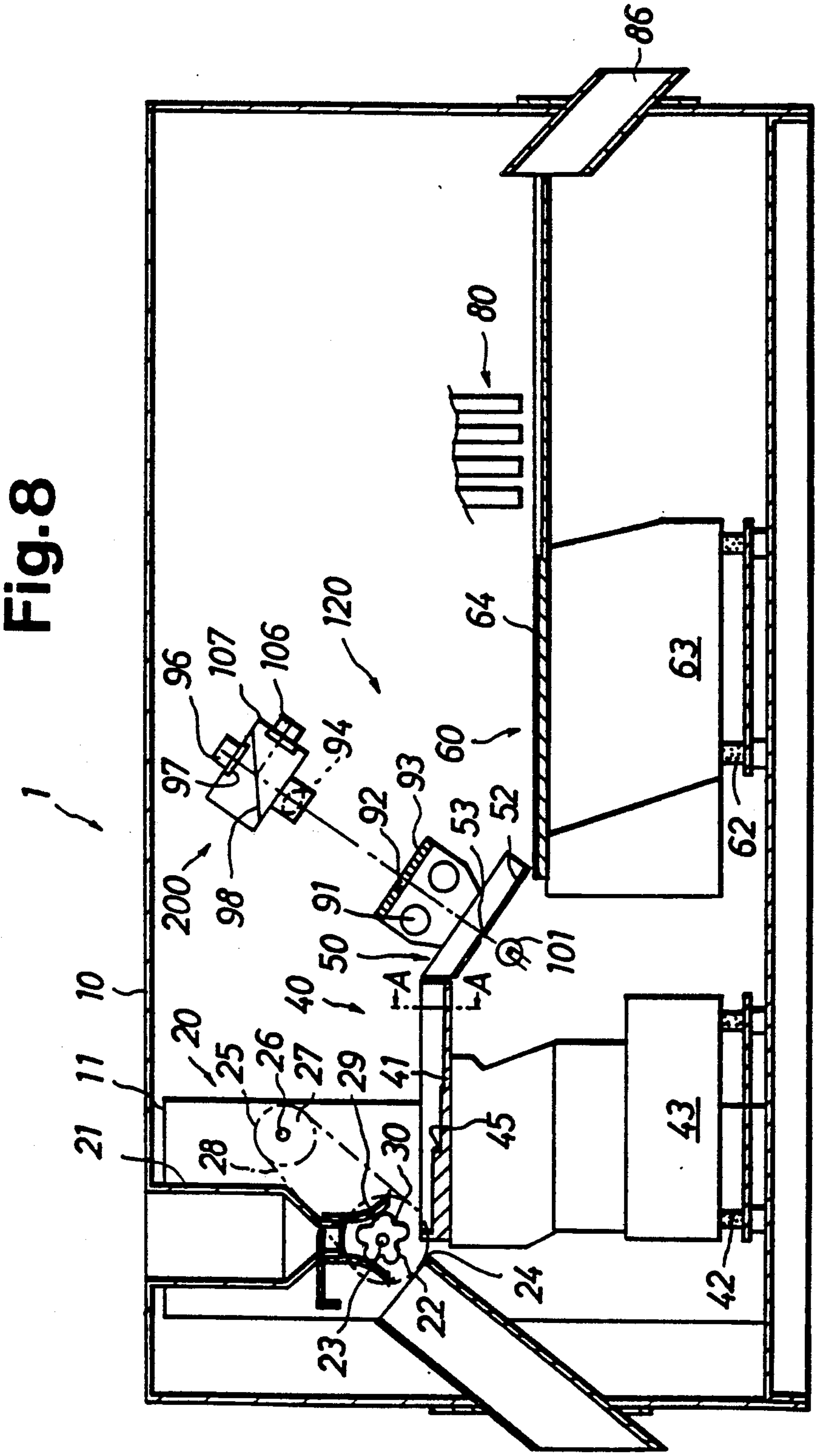
FIG. 8 shows a second embodiment of the apparatus according to the present invention.
Figure 9:
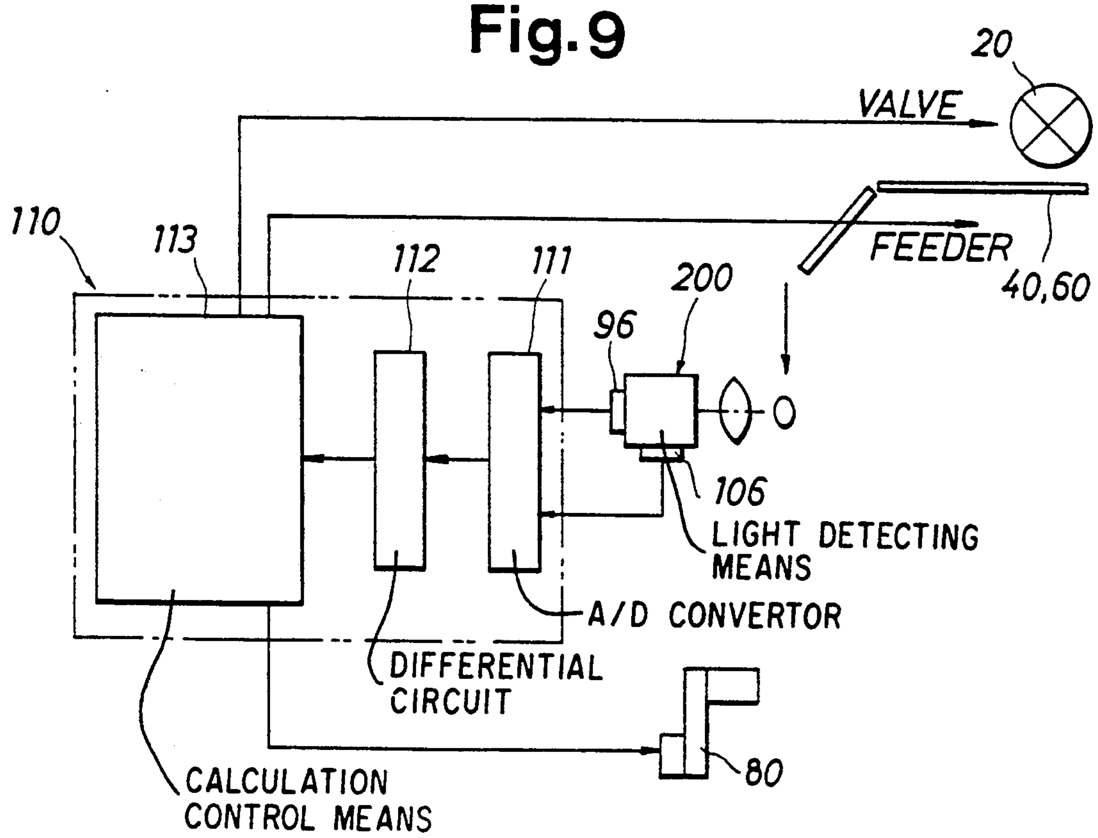
FIG. 9 is a block diagram of the calculation control unit.

Next, a second embodiment of the apparatus for evaluating the grade of rice grains according to the present invention is explained hereinafter with reference to FIGS. 8 and 9. However, the like reference numerals are used for the like parts and elements as in the arrangement of the first embodiment and the explanation therefor is omitted and, here, the explanation is limited to an arrangement different from that in the first embodiment, namely, the specific arrangement and the function of the light amount sensing means 120.

A slit 53 is provided in each of the inclined troughs 50. Above this trough 50 and before and after the slit 53 there are provided light sources 91 of visible light and these light sources 91 are covered by a cover 93 having a slit 92 at a peripheral portion thereof. A light source 101 of infrared light is located underneath the slit 53 of the inclined trough 50. There are provided a condensing lens 94 and a reflected light detecting element 96 at predetermined positions on the line which is vertical to the inclined trough surface 52 and which passes through the center of the upper opening of the slit 53 and the center of the slit 92. A transmitted light detecting element 106 is provided on the line extending vertically from the line vertical to the surface of the inclined trough surface 52. The reflected light detecting element 96 is provided in front thereof with an infrared light cut filter 97. The transmitted light detecting element 106 is provided in front thereof with a visible light cut filter 107. A half mirror 98 has the inclination angles of about 45 degrees with respect to the vertical line referred to above and has its center at the intersection of the light axis of the transmitted light detecting element 106 and the reflected light detecting element 96. The above condensing lens 94, the reflected light detecting element 96, the transmitted light detecting element 106 and the half mirror 98 constitute a reflected/transmitted light measuring unit 200. The reflected/transmitted light measuring unit 200 and the inclined troughs form a light amount sensing means 120.

The light of mixture of the reflected light and the transmitted light, which has passed through the slit 92 and the condensing lens 94, is divided by the half mirror 98 into that in the direction of the axis of light and that in the direction perpendicular to the axis of light. The light divided in the direction of the axis of light becomes only the visible light after passing through the infrared light cut filter 97. This visible light is measured by the reflected light detecting element 96 as the amount of reflected light from the grain. On the other hand, the light divided in the direction perpendicular to the axis of light becomes only the infrared light after passing through the visible light cut filter 107. This infrared light is measured by the transmitted light detecting element 106 as the amount of transmitted light from the same grain. The connection of the reflected light detecting element 96 and the transmitted light detecting means 106 to the calculation control unit 110 is shown in FIG. 9 and this is substantially the same as that of the first embodiment shown in FIG. 4.

Figure 10:
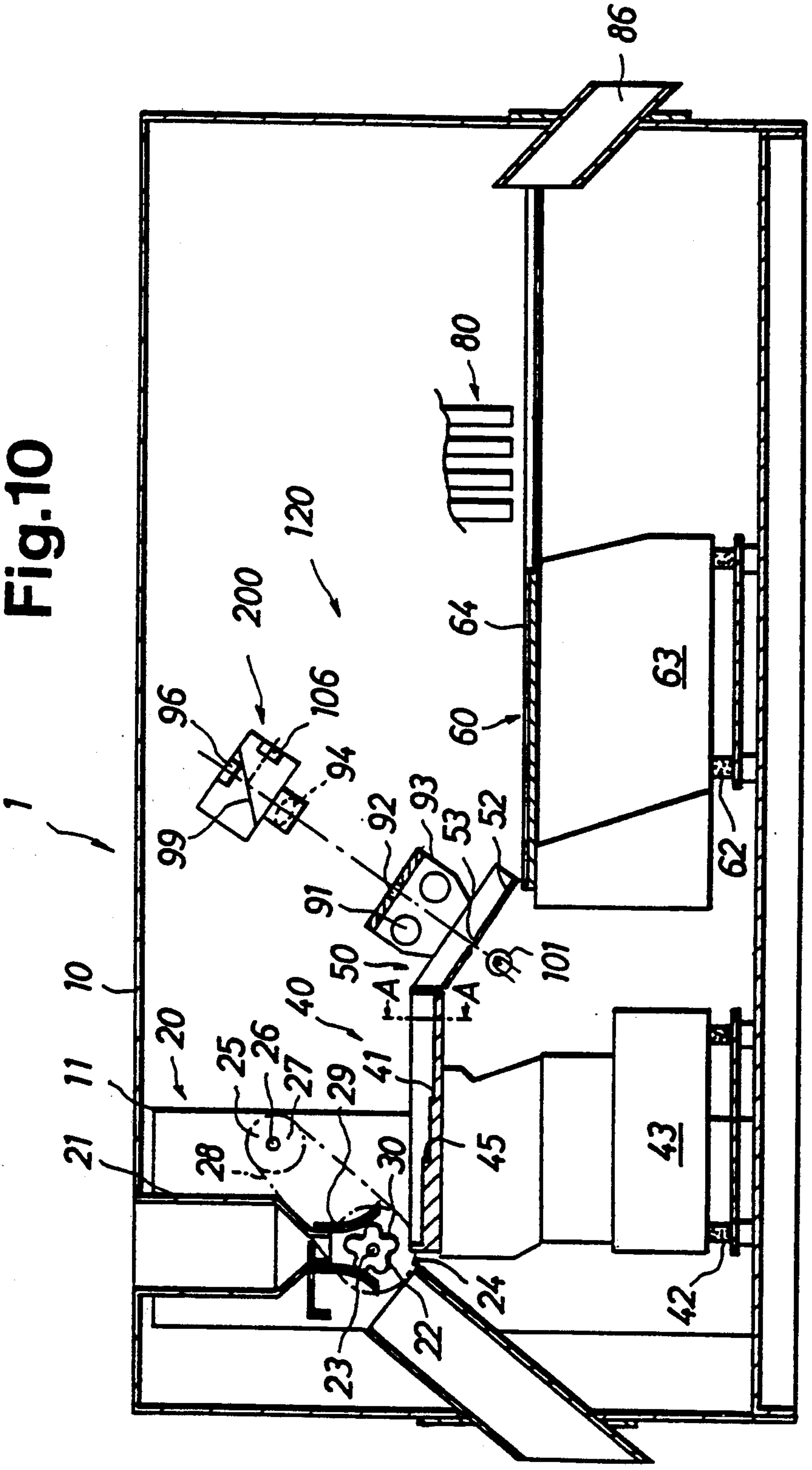
FIG. 10 shows a third embodiment of the apparatus according to the present invention.
Figure 11:
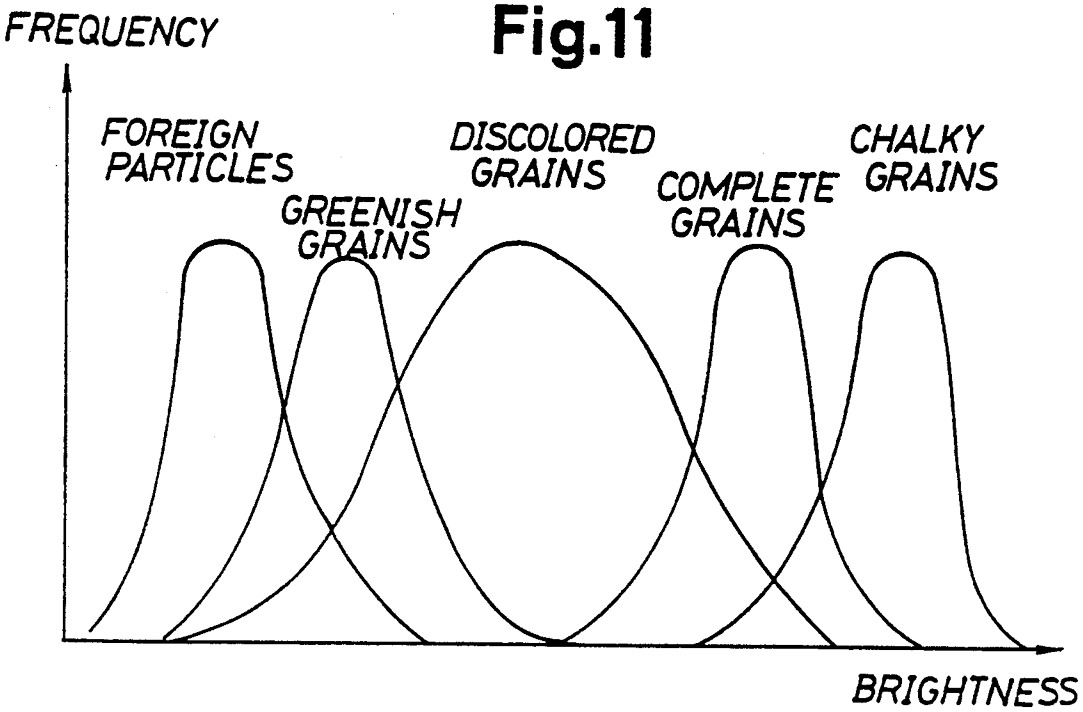
FIG. 11 shows a frequency distribution of foreign particles and various grades of grains.

Now, a third embodiment of the apparatus according to the present invention is explained hereinafter with reference to FIG. 10. However, the like reference numerals are used for the like parts and elements as in the arrangements of the first and second embodiments and the explanation therefor is omitted and, here, the explanation is limited to an arrangement different from that in the first and second embodiments, namely, the specific arrangement and the function of the light amount sensing means 120.

A slit 53 is provided in each of the inclined troughs 50. Above this trough 50 and before and after the slit 53 there are provided light sources 91 of visible light and these light sources 91 are covered by a cover 93 having a slit 92 at a peripheral portion thereof. A light source 101 of infrared light is located underneath the slit 53 of the inclined trough 50. There are provided a condensing lens 94 and a reflected light detecting element 96 at predetermined positions on the line which is vertical to the inclined trough surface 52 and which passes through the center of the upper opening of the slit 53 and the center of the slit 92. A transmitted light detecting element 106 is provided on the line extending vertically from the line vertical to the surface of the inclined trough surface 52. A dichromic mirror 99 is arranged so as to have the inclination angles of about 45 degrees with respect to the vertical line referred to above and to have its center at the intersection of the light axis of the transmitted light detecting element 106 and the reflected light detecting element 96. The above condensing lens 94, the reflected light detecting element 96, the transmitted light detecting element 106 and the dichromic mirror 99 constitute a reflected/transmitted light measuring unit 200. The reflected/transmitted light measuring unit 200 and the inclined troughs form a light amount sensing means 120.

Next, an explanation of the actual function of the light amount sensing means 120 in the third embodiment is made hereinbelow. The light of mixture of the reflected light and the transmitted light, which has passed through the slit 92 and the condensing lens 94, is divided by the dichromic mirror 99 into that in the direction of the axis of light and that in the direction perpendicular to the axis of light, for example, 400 nm–700 nm in the former direction and 1000 nm–1500 nm in the latter direction. The former is of a visible light and is detected by the reflected light detecting element 96 as the reflected light amount from the grain. On the other hand, the latter is of a infrared light and is detected by the transmitted light detecting element 106 as the transmitted light amount from the same grain. The amount of the reflected light and the amount of transmitted light are respectively treated by the calculation control unit 110 in the same way as in the second embodiment.

In the above second and third embodiments of the present invention, it has been explained that the light amount detecting unit is arranged as an unitary structure with the employment of one condensing lens and a half mirror or a dichromic mirror. Of course, it is possible to employ two separate condensing lenses for the transmitted light and the other for the reflected light which come from one point in the inclined trough.

The feature which distinguishes the second and third embodiments over the first embodiment resides in the point that, since the measurement of the transmitted light and the reflected light from the given grain is effected always at the same position within the means on which the grains flow down or move, there is no possibility for any changes in evaluation factors concerning the given rice grain, which may affect the evaluation of the grains, to develop between the point at which the reflected light amount is measured and the point at which the transmitted light amount is measured and also there is no need to take into account any delay time in the measurement between the points at which the respective measurements took place. This enables to increase the accuracy of the evaluation and to simplify the structure of the apparatus.

What is claimed is:

1. A method for evaluating the grade of rice grains, said method comprising the steps of:

moving rice grains in the state in which they are directed in a predetermined longitudinal direction along a passage extending in said longitudinal direction;

irradiating said rice grains by a first beam of light having a predetermined wavelength from a direction intersecting said longitudinal direction;

irradiating said rice grains by a second beam of light having a wavelength different from said first beam of light from behind the side at which the irradiation by said first beam of light takes place;

dividing, according to the differences between said wavelength of said first beam of light and that of said second beam of light, into reflected light components and transmitted light components the beams of light which comprise a reflected light from the reflection of said first beam of light onto the rice grains and a transmitted light from the transmission of said second beam of light through the rice grains and which are received at a predetermined common point;

generating two kinds of electrical signals corresponding to the reflected light and the transmitted light, respectively, after receiving said reflected light components and said transmitted light components respectively and separately; and comparing, after converting said two kinds of electrical signals to respective digital signals, with the levels of threshold values stored in advance in correspondence to a plurality of grades of rice grains.

2. The method for evaluating the grade of rice grains according to claim 1, in which said first beam of light irradiated to the rice grains is emitted from a light source of visible light.

3. The method for evaluating the grade of rice grains according to claim 1, in which said second beam of light irradiated to the rice grains is emitted from a light source of infrared light.

* * * * *